United States Patent
Joo

(10) Patent No.: US 9,241,151 B2
(45) Date of Patent: Jan. 19, 2016

(54) CAMERA SYSTEM FOR THREE-DIMENSIONAL THERMAL IMAGING

(76) Inventor: Hoon Joo, Seoul (KR)

(*) Notice: Subject to any disclaimer, the term of this patent is extended or adjusted under 35 U.S.C. 154(b) by 432 days.

(21) Appl. No.: 13/808,558

(22) PCT Filed: May 31, 2011

(86) PCT No.: PCT/KR2011/003975
§ 371 (c)(1),
(2), (4) Date: May 14, 2013

(87) PCT Pub. No.: WO2012/005445
PCT Pub. Date: Jan. 12, 2012

(65) Prior Publication Data
US 2013/0235163 A1 Sep. 12, 2013

(30) Foreign Application Priority Data
Jul. 5, 2010 (KR) .................. 10-2010-0064419

(51) Int. Cl.
*H04N 13/00* (2006.01)
*H04N 13/02* (2006.01)
*G03B 35/08* (2006.01)
*G06F 3/01* (2006.01)

(52) U.S. Cl.
CPC ............ *H04N 13/0239* (2013.01); *G03B 35/08* (2013.01); *H04N 13/007* (2013.01); *G06F 3/011* (2013.01)

(58) Field of Classification Search
CPC .......... H04N 13/0022; H04N 13/0253; H04N 13/0007; H04N 13/0203; H04N 5/33
See application file for complete search history.

(56) References Cited

U.S. PATENT DOCUMENTS

| | | | |
|---|---|---|---|
| 6,215,898 B1* | 4/2001 | Woodfill et al. | 382/154 |
| 6,750,904 B1* | 6/2004 | Lambert | 348/218.1 |
| 7,786,898 B2* | 8/2010 | Stein et al. | 340/937 |
| 8,170,326 B2* | 5/2012 | Gulati et al. | 382/154 |
| 8,780,182 B2* | 7/2014 | Byren | 348/47 |
| 2006/0215021 A1* | 9/2006 | Suto et al. | 348/139 |
| 2010/0172567 A1* | 7/2010 | Prokoski | 382/132 |
| 2011/0050856 A1* | 3/2011 | Nakazawa et al. | 348/47 |
| 2011/0122232 A1* | 5/2011 | Hoshino | 348/47 |

FOREIGN PATENT DOCUMENTS

| | | |
|---|---|---|
| JP | 03-151652 | 6/1991 |
| JP | 10-040367 | 2/1998 |

(Continued)

OTHER PUBLICATIONS

International Search Report for PCT/KR2011/003975 dated Dec. 27, 2011, 2 pages.

*Primary Examiner* — Victor Kostak
(74) *Attorney, Agent, or Firm* — Reising Ethington P.C.

(57) ABSTRACT

A system for displaying a 3D thermal image by using two thermal imaging cameras and extracting distance/depth data in the thermal images. The system includes two thermal imaging cameras where one thermal imaging camera is used as a master camera serving as a reference and the other is used as a slave camera to correct gain and offset of the thermal images and ensure uniformity. In addition, provided is an apparatus and method for correcting gain and offset of the thermal images to be identical to each other and ensuring uniformity by using a process module separately from two thermal imaging cameras.

14 Claims, 5 Drawing Sheets

(56) References Cited

FOREIGN PATENT DOCUMENTS

| JP | 2003-067725 | 3/2003 |
| JP | 2008-017386 | 1/2008 |
| KR | 10-2005-0027306 | 3/2005 |

* cited by examiner

CAMERA SYSTEM FOR THREE-DIMENSIONAL THERMAL IMAGING

TECHNICAL FIELD

The present disclosure relates to an apparatus for making and displaying a 3-dimensional (3D) stereo thermal image by using a thermal imaging camera and an apparatus and method for extracting distance and depth data from two thermal imaging cameras, and more particularly, to a 3D stereo thermal imaging camera system manufactured by coupling a 3D thermal imaging camera with two 2D thermal imaging cameras and a method for photographing and processing a 3D stereo thermal image by using the system.

BACKGROUND ART

Recently, the techniques for providing 3D stereo images on a screen rapidly increase in various fields such as movies, broadcasting, game or the like. Generally, the terms "3D image" and "3D stereo image" are confusedly used, but strictly speaking, these terms are entirely different from each other. The term "3D image" represents a planar image showing all of x, y and z axes on a general 2D display, and the term "3D stereo image" represents an image implemented on a display to allow a user to feel a depth and a stereoscopic space sense.

Regarding cameras for stereo images to make a 3D stereo image, an image is photographed by two cameras simultaneously and then displayed so that a user may feel perspective and recognize stereo. In this regard, FIG. 1 schematically shows a conventional 3D stereo camera system 2. In order to photograph a stereo image by using cameras, a target 1 is photographed by using two cameras 3a, 3b by using the same principle as both eyes which comprehend prospective of an object. After two right and left cameras 3a, 3b are mounted to a rig (a device for arranging cameras vertically and horizontally and fixing them) and photograph a target 1, images photographed by the right and left cameras 3a, 3b are overlaid to make a stereoscopic image. At this time, two cameras should be synchronized for their exposure, focusing, shutter speed or the like, and for this, the cameras 3a, 3b are respectively controlled by a controller 4.

A thermal imaging camera is a device for imaging infrared rays present in the natural world and having a very long wavelength of 1 μm to 14 μm in comparison to visible rays. Since the thermal imaging camera displays a thermal image, it displays image in a gray level using black and white as well known in the art according to high or low of the thermal energy. Therefore, the thermal image may be misunderstood as a black-and-white image but it contains information for thermal energy. Until now, all kinds of thermal imaging cameras have drawn the thermal image and have been simply used for measuring the presence or movement of a target or measuring temperature or heat distribution.

If the thermal imaging data is displayed as a 3D stereo image, it is possible to obtain more accurate and abundant information about the target. However, there has been no attempt to couple thermal imaging data with 3D stereo image data so far. In order to couple 3D stereo image data and thermal imaging data, various problems should be solved, and the most important problem is that a target should be photographed simultaneously and accurately by using two thermal image cameras with the identical performance. The thermal imaging camera includes a lot of temperature sensor elements, which are also called detectors. However, since individual temperature sensor elements respond to a surrounding temperature and a target temperature in different ways, non-uniformity phenomenon occurs and so images photographed by two cameras may be different. In other words, since detectors of a camera have different gain and offset in the temperature sensor array, thermal images obtained by two cameras become different, and so it is impossible to implement a proper 3D stereo thermal image.

The present disclosure is directed to providing a 3D stereo thermal imaging camera system which may provide a 3D stereo thermal image and distance/depth data by solving problems caused by different element performance of detectors of two thermal imaging cameras.

The present disclosure is also directed to providing a software processing method which allows high-speed frame processing by processing only an image area of interest for the purpose of high-speed data processing.

In one general aspect, the present disclosure provides a 3D stereo image camera system for generating a 3-dimensional (3D) stereo image, which includes: first and second thermal imaging cameras 100a, 100b horizontally spaced apart by a predetermined distance to photograph a subject; and a stereo & disparity engine 300 for providing a control signal and a clock signal to the first and second thermal imaging cameras, receiving thermal imaging data from each of the thermal imaging cameras, and calculating disparity data, distance/depth data, and temperature data of the subject from the thermal imaging data.

In addition, in the 3D stereo image camera system, the first thermal imaging camera may operate as a master camera, the second thermal imaging camera may operate as a slave camera, and the reference value relating to the performance of at least one property may be a reference value relating to the master camera.

In the present disclosure described above, since one of right and left thermal imaging cameras has a master function and the other thermal imaging camera has a slave function, a master thermal imaging camera plays a role of providing various references, and the slave camera is adjusted with reference to the reference data of the master camera so that both thermal imaging cameras resultantly have the same performance. Accordingly, since both cameras may ensure the matched performance by based on matched functioning, it is possible to provide a 3D stereo thermal image and distance/depth data. In addition, since a separate camera having a master function may plays a role of various references, two thermal imaging cameras may ensure matched performance and provide a 3D stereo thermal image and distance/depth data.

DESCRIPTION OF DRAWINGS

The above and other objects, features and advantages of the present disclosure will become apparent from the following description of certain exemplary embodiments given in conjunction with the accompanying drawings, in which.

DETAILED DESCRIPTION

Hereinafter, the embodiments of the present disclosure will be described in detail with reference to accompanying drawings.

Figure 2:
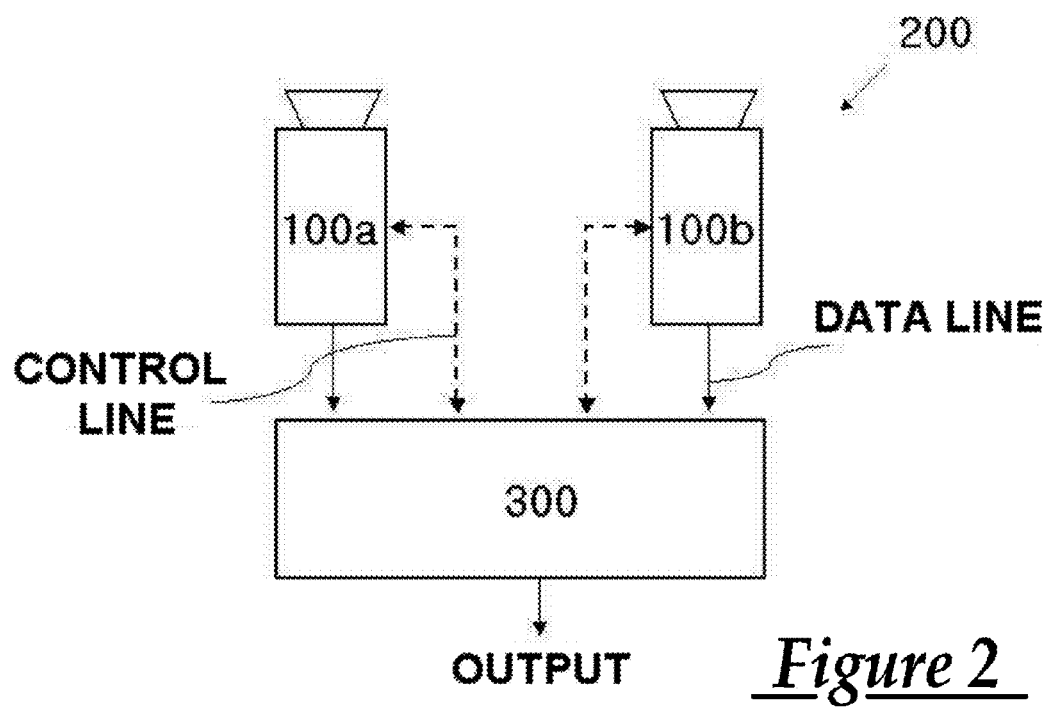
FIG. 2 is a schematic view showing a 3D thermal imaging camera system according to an embodiment of the present disclosure.

FIG. 2 schematically shows a 3D thermal imaging camera system according to an embodiment of the present disclosure. The 3D thermal imaging camera of the present disclosure includes right and left cameras 100a, 100b, in which one is a master camera serving as a mater and the other is a slave camera serving as a slave. Either of the cameras may be selected as a master according to the working environments where the camera system of the present disclosure is implemented. In the embodiment of the present disclosure, the left camera 100a is selected as a master camera, and the right camera 100b is selected as a slave camera. In addition, the basic concept of the present disclosure is not changed even though the master function is separately set.

Generally, for allowing a 3D stereo image to be naturally looked by a person, two cameras are installed by about a distance between both eyes of a person (about 6 to 7 cm). In the present disclosure, two cameras 100a, 100b are fixed to and supported by a fixing device such as a rig or a separate structure having a fixing function while maintaining a distance of about 5 to 50 cm between them. The distance is not limited to the above and may be increased or decreased.

In addition, as shown in FIG. 2, two cameras 100a, 100b are connected to a stereo & disparity engine 300 serving as a control means and provide thermal imaging data photographed by each camera. The stereo & disparity engine 300 applies various control signals to the cameras 100a, 100b through a control line to control both cameras to have the same performance.

Even though FIG. 2 shows that the cameras 100a, 100b and the stereo & disparity engine 300 are conceptually classified as blocks, a detailed location of each component may be changed according to the circumstance. For example, the stereo & disparity engine 300 may be formed as a case integrated with either the master camera 100a or the slave camera 100b, and all of the master camera 100a, the slave camera 100b, and the stereo & disparity engine 300 may be mounted in a single case.

Hereinafter, a method for making a 3D stereo thermal image by using thermal images photographed by the master camera 100a and the slave camera 100b will be described in detail with reference to FIG. 3.

Figure 3:
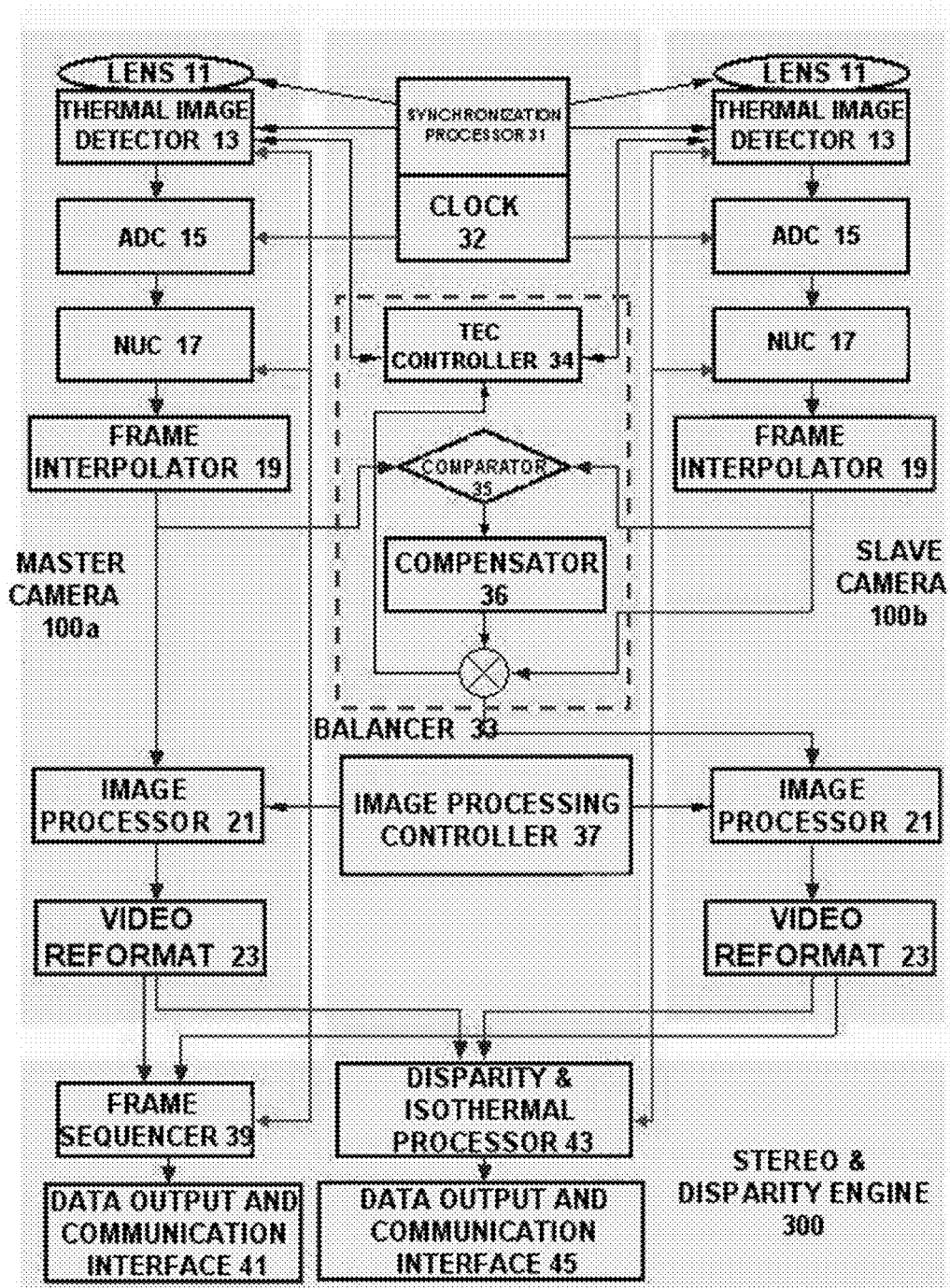
FIG. 3 is a block diagram showing an overall configuration of the system of FIG. 2.

FIG. 3 is a block diagram showing a detailed configuration of the system of FIG. 2, which includes the master camera 100a, the slave camera 100b, and the stereo & disparity engine 300. The master camera 100a and the slave camera 100b have identical components, for example the following components, without being limited thereto.

- a lens 11;
- a thermal image detector 13 such as a temperature sensor array;
- an ADC means 15 for converting an output of the thermal image detector, if it is an analog signal, into a digital signal;
- a non-uniformity correcting (NUC) means 17 for performing non-uniformity correction to a thermal image;
- a frame interpolator 19 for modifying a thermal image by means of frame recursion and dead pixel interpolation;
- an image processor 21 for filtering and adjusting histogram, peaking, brightness, contrast or the like; and
- a video reformat means 23 for changing a format of a thermal image according to the purpose.

In addition, the stereo & disparity engine 300 includes the following components, without being limited thereto.

- a synchronization processor 31 for controlling focusing and shutter motions of the lenses 11 of the master camera and the slave camera to be synchronized;
- a clock generating unit 32 for synchronizing motions of two cameras by providing a reference clock to the master and slave cameras;
- a balancer 33 for matching the operation of the slave camera based on the operation of the master camera and eliminating the difference in performance of two thermal imaging cameras, which includes a temperature sensor for correcting temperature, a Thermo Electric Cooler (TEC) controller 34, a comparator 35 for comparing outputs of two thermal imaging cameras 100a, 100b, and a compensator 36 for compensating gain and offset values of the slave camera (on occasions, the master camera together) according to the comparison result;
- an image processing controller 37 for controlling the image processor 21 according to control information such as histogram specification, peaking, brightness, shading or the like;
- a frame sequencer 39 for arranging and transmitting outputs of the master and slave cameras 100a, 100b in order;
- a disparity & isothermal processor 43 for making a stereo image from thermal images of the master and slave cameras 100a, 100b; and
- means 41, 45 for outputting data from the frame sequencer 39 and the disparity & isothermal processor 43, respectively, and giving a communication interface thereto.

The cameras 100a, 100b and the stereo & disparity engine 300 may exclude some of the above components or include additional components. In addition, the block of the stereo & disparity engine 300 may be partially separated and included in the master camera 100a and the slave camera 100b, respectively, and a component for performing this function may be separately included.

Hereinafter, some of the components will be described in more detail. First, though not shown in the figures, a shutter is preferably located between the lens 11 and the thermal image detector 13. The shutter is physically located in front of the thermal image detector 13, and in an embodiment, the thermal image detector 13 may be configured as a module together with the shutter. The shutter plays a very important role to operate two cameras simultaneously. Therefore, two cameras 100a, 100b receive a control signal from the synchronization processor 31 and make synchronized shutter motions, and accordingly very similar corrections and compensations may be applied to non-uniformity thermal imaging data, which contributes to decreasing thermal image errors for the same target between two thermal imaging cameras.

In an embodiment, the synchronization processor 31 includes a synchronized focus controller for synchronizing focusing of each of lenses of the master and slave camera and a synchronized shutter controller for synchronizing shutter motions of the lenses. The synchronized focus controller controls the lens 11 of the master camera and the lens 11 of the slave camera to be focused on the same target, and the synchronized shutter controller controls an operation of a shutter located in front of the thermal image detector 13. The synchronized shutter start/stop means that two thermal imaging cameras are corrected and compensated to a surrounding temperature at the same time, and it may be assumed that two thermal imaging cameras exposed to the air of the surrounding environment are under the same temperature. At this time, in order to ensure as accurate correction and compensation as possible, it is preferred to use a shutter made of a single blade.

The clock generating unit 32 synchronizes operations of two cameras by providing a reference clock to the master camera 100a and the slave camera 100b. In the embodiment depicted in the figures, a clock signal is supplied to the thermal image detector 13, the ADC means 15, and the NUC means 17, and the clock signal is also supplied to the frame sequencer 39 and the disparity & isothermal processor 43 in the stereo & disparity engine 300. Preferably, a single synchronized master clock generator is used so that two thermal imaging cameras share a single master clock, which generates a necessary clock signal such as pixel data, a H synchronization signal, and a V synchronization signal at the same time.

The non-uniformity correction (NUC) means 17 corrects non-uniformity of a thermal image. Even though two thermal imaging cameras 100a, 100b have identical offset and gain, correct result data may not be derived if they are different in uniformity. Therefore, in the present disclosure, the NUC means 17 is added to correct the master and slave cameras to have identical uniformity. As a correction method for allowing two cameras to have the same uniformity, it is possible to photograph the same subject as a target under the same temperature condition by using two thermal imaging cameras in an initial stage, and then correct data of the slave data by comparing data of each camera obtained therefrom with standard data or matching data of each camera with the data of the master camera so that two camera becomes identical in terms of performance. The uniformity of the thermal imaging camera needs a technical solution which ensures temperature stability and continuous compensation. For this, a technique of continuously monitoring detector temperature sensors of two cameras is applied to prevent temperature difference and shaking by means of PID control.

In addition, the NUC means 17 has a function of correcting and controlling gain and offset of a thermal imaging camera. In order to match gain and offset, for example, an external physical temperature area may be matched by setting an internal temperature of the thermal image detector 13, or a bias may be set in the thermal image detector 13.

The balancer 33 compares thermal imaging data output from the master camera 100a with thermal imaging data output from the slave camera 100b and compensates their difference. In an embodiment, the balancer 33 includes a TEC controller 34, a comparator 35, and a compensator 36. First, thermal imaging data is input from each frame interpolator 19 to the comparator 35 and offset and gain values of the master camera and the slave camera are compared. If the difference is detected, the thermal imaging data compensated as much as the difference is transferred to the image processor 21 of the slave camera 100b. Therefore, the image processors 21 of the master camera 100a and the slave camera 100b process images in a state of being compensated so that both cameras have the same offset and gain. In addition, the detected difference in offset and gain is input to the TEC controller 34, and the control signal of the TEC controller 34 is provided to the thermal image detector 13 of the slave camera 100b in order to compensate the offset and gain values of the slave camera 100b based on the offset and gain of the master camera 100a.

In this regards, the thermal image detector 13 may be classified into two types, namely a cooling type and a non-cooling type. The cooling type includes a method of cooling a sensor of a detector by a cryogenic pump (−196° C.) and a method of cooling a sensor by injecting liquid nitrogen or other cooling gases. The non-cooling type may include a temperature stabilizing device (generally, TEC) or not. In the cooling type, the TEC control is not necessary, and the offset and gain may be controlled by adjusting a condition such as biasing. In the non-cooling type, on the assumption that a TEC is included, the TEC controller 34 of the present disclosure performs controlling. Therefore, in case of using a non-cooling type detector not including a TEC or a cooling type detector as alternative embodiments of the present disclosure, the TEC controller 34 is not necessary, and the balancer 33 may be configured according to a suitable control method for a corresponding thermal image detector, instead of using the TEC controller 34.

In addition, in relation to the gain and offset correcting process performed by the NUC means 17 and the balancer 33, respectively, the NUC means 17 corrects non-uniformity (including correction of the offset and gain) independently for the master camera and the slave camera, and the balancer 33 changes a basic offset of the thermal image detector 13 by modifying temperature in the thermal image detector 13 or modifying a bias under the control of the TEC controller 34. Therefore, the balancer 33 compensates differences in the offset and gain values between the master camera and the slave camera and matches the uniformity. In other words, the NUC means 17 is independently operated in the master camera and the slave camera. Assuming that a single thermal imaging camera is used, for example, the correcting work is completed by the NUC means 17. However, since the present disclosure is directed to matching the performance of two cameras, namely the master camera and the slave camera which are completely compensated, for this, the balancer 33 is provided to compensate the difference in offset and gain values between the master camera and the slave camera. Therefore, an alternative embodiment for correcting the difference in offset and gain values of the master camera and the slave camera may also be provided. For example, the balancer 33 may be configured to control the NUC means 17 instead of controlling the thermal image detector 13, or may be configured to control both the thermal image detector 13 and the NUC means 17. In other words, it is important that the balancer 33 has a function of compensating the master camera and the slave camera to have the same offset and gain values regardless of a subject to be controlled.

Meanwhile, in an embodiment, the balancer 33 may match gray scales of the master camera and the slave camera and match dynamic ranges thereof. In other words, when a thermal image is shown in a black-and-white gray scale, if the black and white levels, namely the gray level values, are not matched, this image is not suitable as data for a 3D stereo image. In addition, the dynamic range means a range in which a camera may effectively express brightness and darkness and is an important factor greatly influencing on the color sense of an image. However, cameras have different dynamic ranges. Therefore, the dynamic ranges of the master camera and the slave camera are matched and thus compensated to show the same gray scale with respect to the same temperature.

The frame interpolator 19 corrects a thermal image by means of frame recursion and dead pixel interpolation. Generally, the thermal image detector 13 for detecting infrared rays malfunctions more frequently due to bad pixels or dead pixels, different from a general CCD module. In addition, in case of using two thermal imaging cameras for a stereo image, bad pixels or dead pixels are not easily generated at the same position of both cameras, and the pixels at the same location do not have the identical performance. Therefore, the frame interpolator 19 uses various algorithms for compensation in order to decrease an influence caused therefrom.

The image processor 21 filters and adjusts histogram, peaking, brightness, contrast and a thermal image. The histogram shows pixel distribution of bright pixels and dark pixels in an image, and the darkest value is defined as 0 (black) and the brightest value is defined as 255 (white). The peaking is used for further emphasizing a specific portion of an image.

In an embodiment, the image processing controller 37 includes a histogram controller having histogram details about the master camera and the slave camera and centrally controlling the same, and a peaking/filter and brightness/contrast controller. The control signal sent from the image processing controller 37 to each image processor 21 of the master and slave cameras 100a, 100b includes reference values for the histogram, the brightness, and the contrast. In order to set the master camera and the slave camera to have the same reference value, for example, the master and slave cameras photograph a single reference black body as a target, and then the histogram, brightness, and contrast values in a thermal image of the master camera obtained therefrom may be used as reference values, which are used to set corresponding values of the slave camera.

The frame sequencer 39 arranges and transmits outputs of the master and slave cameras 100a, 100b in order. When transmitting image information of two cameras, it is preferred to transmit both data simultaneously. However, both data may not be transmitted simultaneously according to the circumstance of a communication system connected to a rear end thereof (due to small capacity or the like). In this case, the frame sequencer 39 may send both data in order, for example by sending right and left images sequentially, or may divide image data into frames and transmit the frames alternately.

Figure 4:
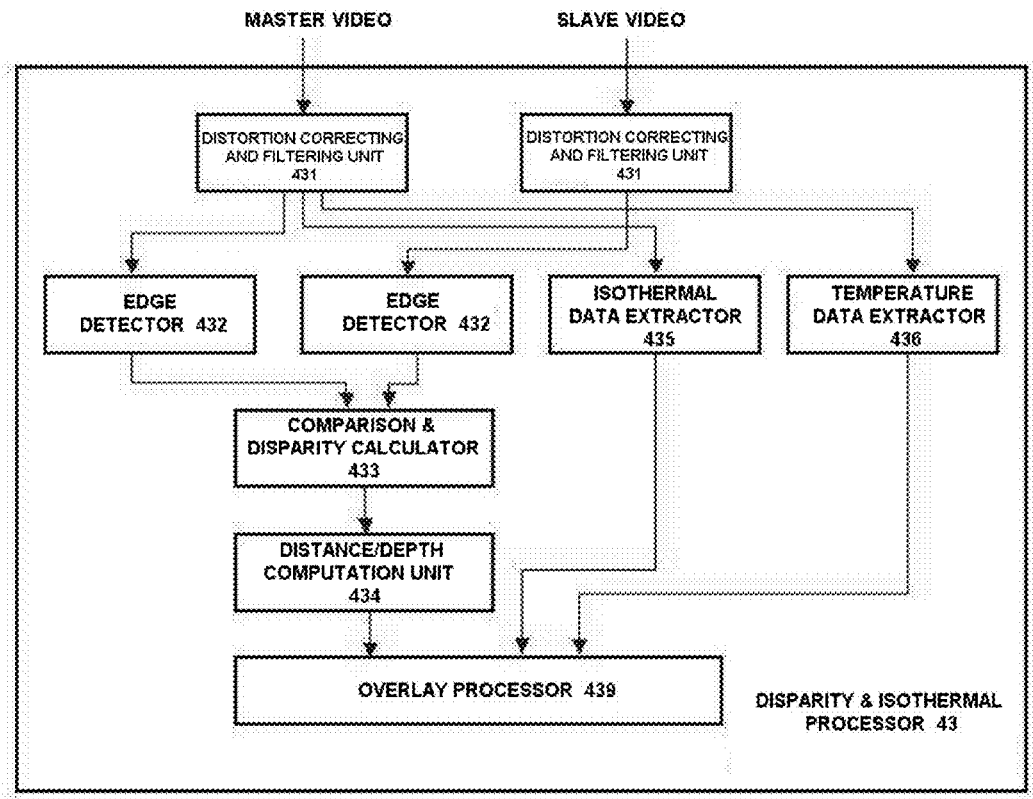
FIG. 4 is a block diagram showing a detailed configuration of a disparity & isothermal processor 43 of FIG. 3.

The disparity & isothermal processor 43 makes a stereo image from the thermal images of the master and slave cameras 100a, 100b and will be described later with reference to FIG. 4. FIG. 4 is a block diagram showing detailed configuration of the disparity & isothermal processor 43 of FIG. 3.

In the embodiment depicted in FIG. 4, the image data of the master camera and the image data of the slave camera are respectively put into a distortion correcting and filtering unit 431. The distortion correcting and filtering unit corrects and filters barrel distortion, radial distortion or the like, caused by the lenses 11 of the thermal imaging cameras. In other words, even though two thermal imaging cameras have the same performance due to various controls described above, the actually output thermal imaging data may not output a proper image due to distortion of the lenses 11 or other structural mismatching. Therefore, the distortion correcting and filtering unit 431 corrects such physically non-arranged portions, namely distortion of the lenses or other misalignments of the lenses of the cameras. For this distortion correction, warping modeling for extracting a correction coefficient or distorted image correction are generally used, and the present disclosure may also use a general algorithm well known in the art. In addition, this block generally uses a median filter and various filters for removing noise so that original thermal imaging data may be maintained against other noises.

Referring to FIG. 4 again, the thermal imaging data of the master camera output from the distortion correcting and filtering unit 431 is input to an edge detector 432, an isothermal data extractor 435, and a temperature data extractor 436, and the thermal imaging data of the slave camera is input to the edge detector 432. The edge detector 432 detects contours of subjects in a thermal image, and an edge of an article may be detected by calculating a pixel gradient. In two thermal images obtained from the master camera and the slave camera, even though the cameras are physically aligned, a minute temperature difference occurs between the right and left thermal images. Therefore, a difference between temperature values of two thermal images is found to detect an edge of an article, and a high-pass filter is used since the edge has a high frequency as its own frequency.

The output from the edge detector 432 is then input to a comparison & disparity calculator 433. The comparison & disparity calculator 433 compares the image of the master camera with the image of the slave camera and calculates disparity data. The term 'disparity' means a difference in locations and shapes of an article within a visual field, looked from two positions (both cameras), and the term 'disparity data' is obtained by imaging the data about the difference. For example, when two articles with different distances are displayed, the article at a short distance may be displayed in white and the article at a long distance may be displayed in black by using the black-and-white scale. Alternatively, the black-and-white scale may be replaced with color. The comparison & disparity calculator 433 makes a map of the disparity data, namely a disparity map, from two thermal images, and various algorithms such as Sum of Absolute Difference (SAD), Sum of Squared Difference (SSD) and Cross Correlation (CC) are known as relevant algorithms.

The data obtained from the comparison & disparity calculator 433 is sent to a distance/depth computation unit 434. The distance or depth means a distance between a camera and a target, obtained by measuring disparity. As a method for calculating distance/depth from disparity data, the following math figure and various methods based thereon are known in the art.

Figure 1:
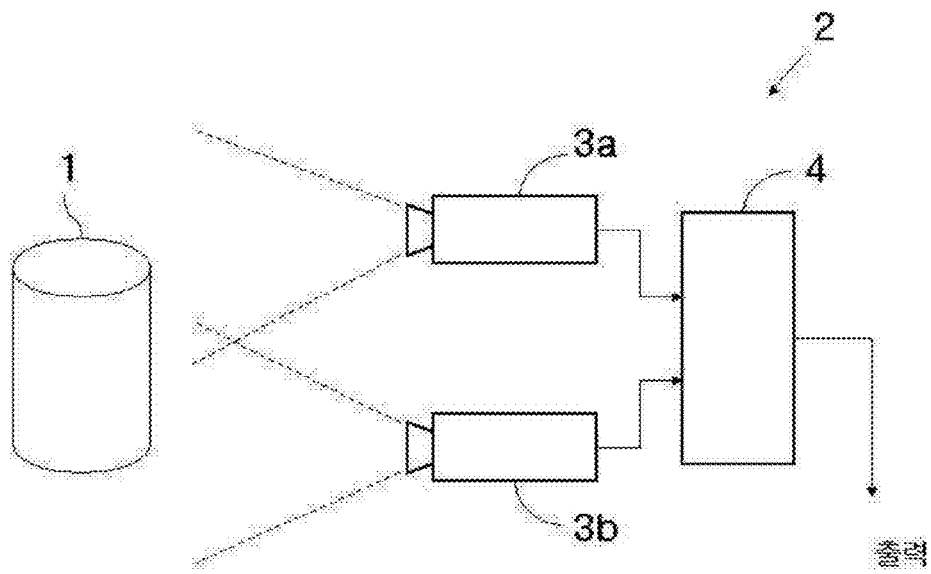
FIG. 1 is a schematic view showing a conventional 3D stereo camera system.

[Math Figure 1]

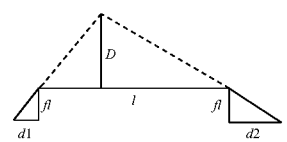

$$D = \frac{l \times fl}{d1 + d2} = \frac{\text{Span} \times \text{FocalLength}}{\text{Disparity}}$$

Here, D represents a distance between a camera and a target, l represents a span between two cameras, fl represents a focal length, and d1+d2 represents disparity.

The thermal imaging data of the master camera output from the distortion correcting and filtering unit 431 is sent to the isothermal data extractor 435 and the temperature data extractor 436. Temperature-related data (isothermal data and temperature data) about the thermal image is extracted from the extractors 435, 436 and then transmitted to an overlay processor 439. The overlay processor 439 overlays the temperature data on the stereo image data previously extracted from the comparison & disparity calculator 433 and the distance/depth computation unit 434 and then displays the same.

The overlaying and displaying method may use a method of expressing temperature data showing a temperature distribution on a display like distance/depth data, or a method of expressing temperature data as a graphic like contour lines. In this case, the stereo image information and the thermal image information may be displayed on a single screen by exhibiting, for example, stereo image data (namely, disparity data or distance/depth data) in color and contour lines in black and white. This thermal distribution may be obtained according to a given command, namely to extract only an area having the same temperature, exhibit only an area above or below a specific temperature, or exhibit only an area between two specific temperatures. In an alternative embodiment, temperature-related data, disparity data and/or disparity/depth data may be overlaid on a single image (or, 2D image) of the image of the master camera and the image of the slave camera to display stereo and temperature information on a 2D screen.

Meanwhile, in an alternative embodiment of the present disclosure, the above displaying process may be performed only to a partial temperature area of interest or a partial image area of interest based on the master. In this case, image data may be processed very rapidly in comparison to the case of processing the entire image, and so this embodiment is very effective when processing high-speed frames. This operation may be performed by the image processor 21, the image processing controller 37, or the disparity & isothermal processor 43, and since this is processed in a software manner, a processor allowing rapid processing may take charge of this operation in a series of image processing stages shown in FIG. 3. For example, in the case the image processing controller 37 performs this operation, if a predetermined area is designated in the thermal image photographed by the master camera automatically by the stereo image system or manually by a user, a thermal image of the slave camera corresponding to the designated area is calculated, and then a following imaging process is performed only to the designated area. Therefore, by reducing an image area to be processed, the data processing rate may be greatly improved.

Figure 5:
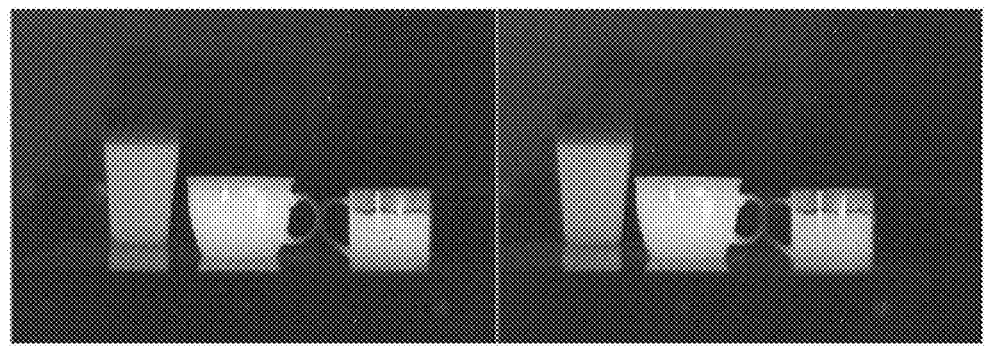
FIG. 5 is a diagram showing an example of right and left images photographed by the 3D stereo camera system of the present disclosure.
Figure 6:
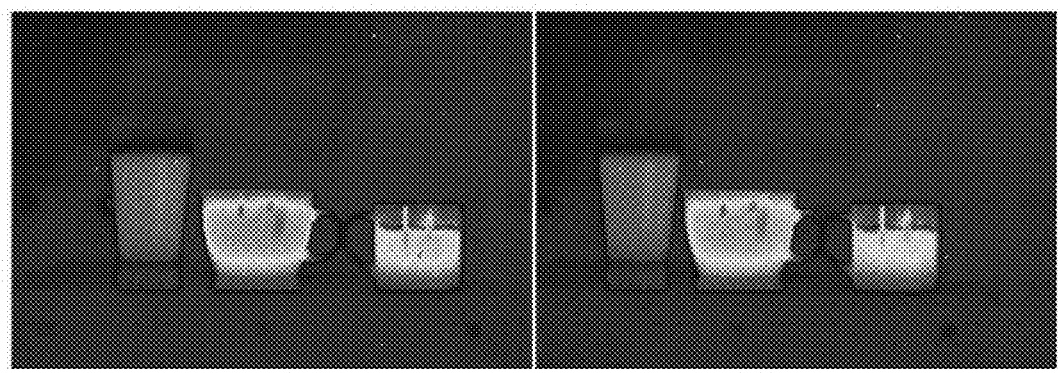
FIG. 6 shows right and left images obtained by processing color of the image of FIG. 5 according to temperature.

FIGS. 5 to 9 show a detailed embodiment of the above overlaying method. First, FIG. 5 shows right and left thermal images, obtained by photographing a predetermined target (three cups located at different distances from the camera and containing water with different temperatures) by using the thermal imaging camera of the 3D stereo camera system according to the present disclosure. The thermal image is displayed in a black-and-white gray scale as conventionally, and the same target is photographed by using the right and left cameras. Therefore, it may be understood that disparity is present between the right and left thermal images. In addition, FIG. 6 shows an image obtained by coloring the temperature of the thermal image of FIG. 5. In the image depicted, the color shows higher temperature from blue to red.

Figure 7:
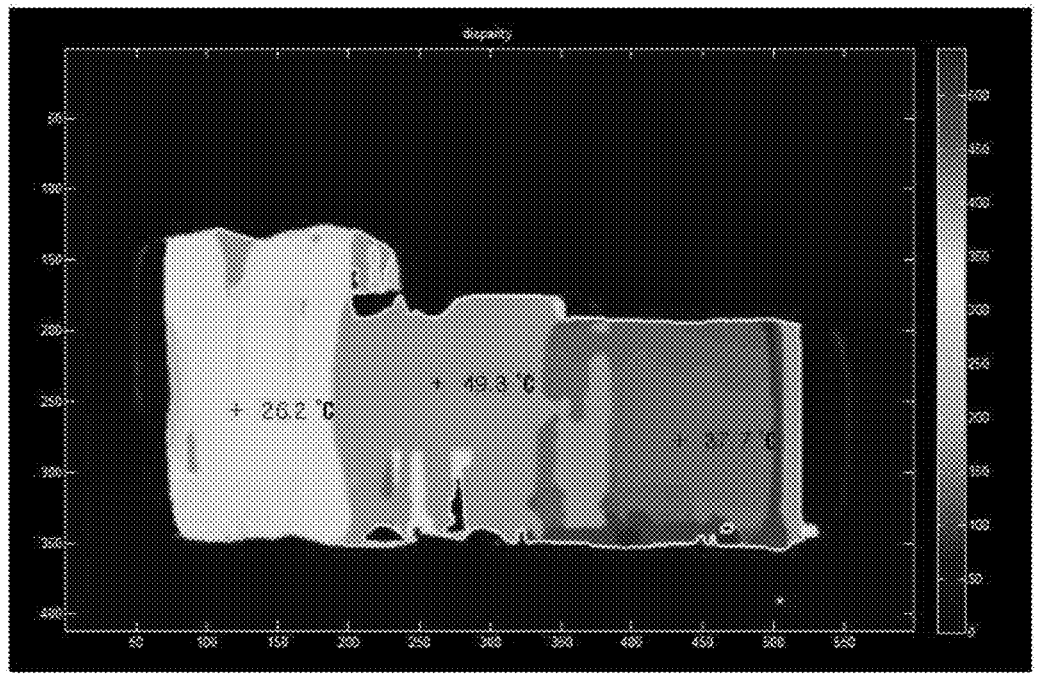
FIG. 7 shows an image obtained by overlaying color disparity data and temperature data on the image of FIG. 5.

FIG. 7 shows an example of overlaying disparity data and temperature data. Disparity data and temperature data are respectively extracted and calculated from the right and left thermal images of FIG. 5 by means of the comparison & disparity calculator 433, the distance/depth computation unit 434, the isothermal data extractor 435, and the temperature data extractor 436, and then the disparity data and the temperature data are overlaid on a single screen. In the image of FIG. 7, numerals in the left of the y axis and numerals in the x axis represent pixel numbers of the thermal imaging camera, and numerals in the right of the y axis represent disparity values corresponding to each color. In the embodiment of FIG. 7, a disparity value is displayed greater from blue to red. As an article is closer, the disparity of the corresponding article recognized by the right and left cameras is greater. Therefore, the corresponding article is nearer to the camera as being closer to red and is farther from the camera as being closer to blue. In other words, in the image of FIG. 7, it may be understood that the rightmost cup is nearest to the camera and the leftmost cup is farthest from the camera.

In addition, in FIG. 7, "+" is marked at every location of each cup and a temperature value is overlaid at its side. This temperature value represents a temperature of a pixel with the corresponding mark. If a user changes the "+" mark to another pixel, a temperature value of the newly designated pixel is displayed. In addition, in an alternative embodiment, a user may set a predetermined area instead of designating a single pixel. In this case, an average temperature of the predetermined area may be calculated and displayed.

Figure 8:
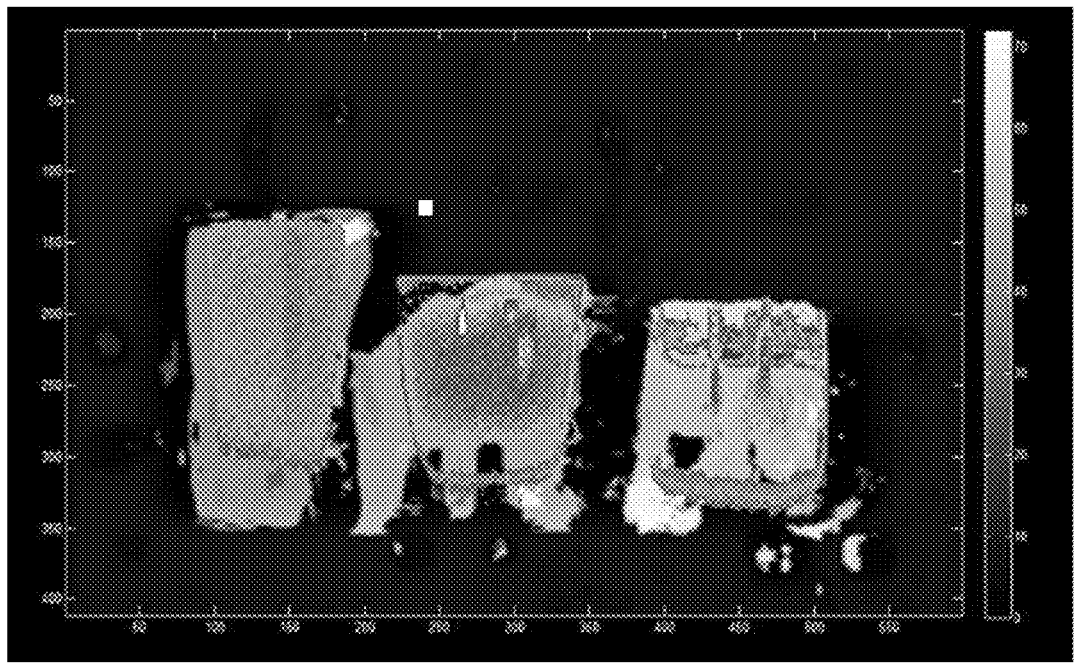
FIG. 8 shows an image obtained by overlaying black-and-white disparity data and color temperature distribution data on the image of FIG. 5.

FIG. 8 shows that black-and-white disparity data and color temperature distribution data are overlaid, where the disparity data is shown in black. At this time, as shown in the right of the y axis in the image, the disparity value increases from black to white, which means an article is nearer to the camera. Therefore, in the image of FIG. 8, since the rightmost cup is relatively nearer to white in comparison to the leftmost cup, it may be understood that the right cup is located nearer to the camera. In addition, since temperature distribution is displayed in color together with the disparity data, a user may recognize temperature distribution and a location of a target from the camera from a single image.

Figure 9:
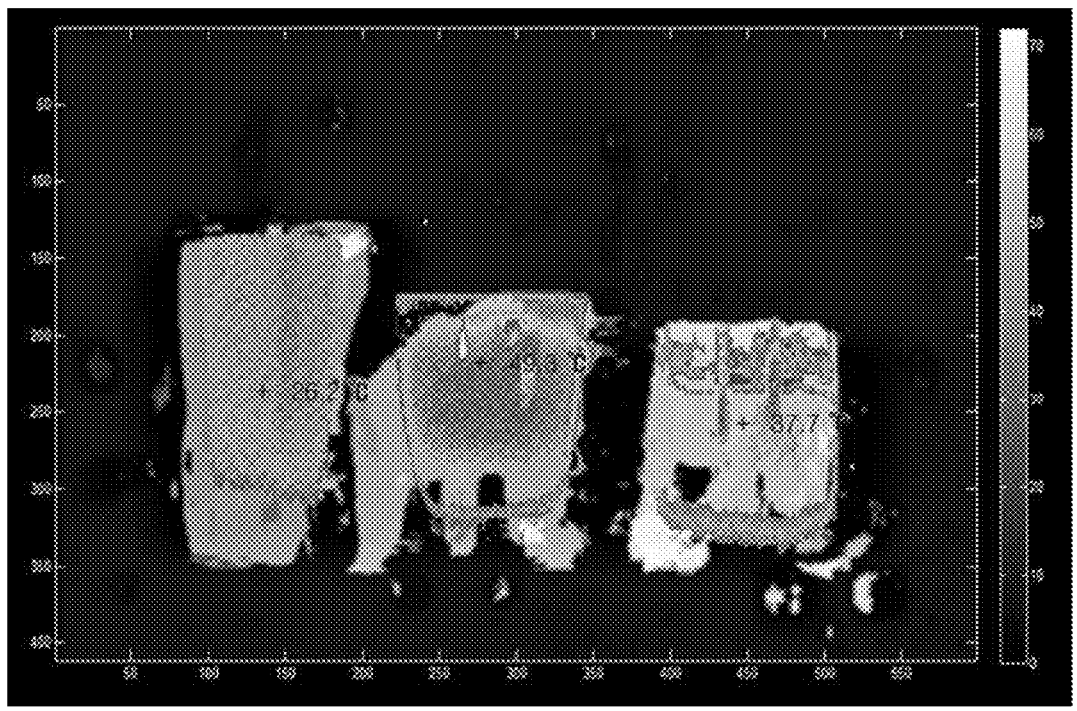
FIG. 9 shows an image obtained by overlaying black-and-white disparity data, color temperature distribution data, and temperature data on the image of FIG. 5.

FIG. 9 shows an image to which temperature data is further added in comparison to that of FIG. 8. In other words, as described above with reference to FIG. 7, a temperature value of a pixel marked with "+" is displayed at the side, and also if a user moves the "+" mark to another pixel, a temperature value of the newly designated pixel may be displayed.

As described above, the present disclosure implements a stereo thermal imaging camera system which may overcome the difficulty of matching two thermal imaging cameras in terms of space as well as performance when making a 3D stereo thermal image. In addition, together with processing disparity data for a stereo image, since an original image is a thermal image, the present disclosure has an important technical meaning in that temperature data may be overlaid and displayed together with the disparity data (and/or distance/depth data). A distance of a target may be extracted from the disparity data, and if temperature data is added to the distance data, an article may be recognized and perceived in a much easier way. For example, in case of checking a target at a remote location by using the stereo thermal imaging camera system of the present disclosure, if the size is not seriously different, a user may easily discriminate from the temperature distribution whether the target is an animal or an article. This method may be applied to various fields such as a monitoring camera, a thermal imaging microscope, a body heat diagnosis of a medical instrument, simultaneous representation of 3D thermal images of bones and sinews, or the like.

In other words, even though it was conventionally possible only to observe energy distribution or heat phase in a visible temperature range from a thermal image, the present disclosure is not limited thereto but allows new thermal analysis by demanding stereoscopic data about heat distribution and analyzing the data, which may also give a great influence on various industrial fields. For example, in the medical field, the progress, location and degree of a disease may be easily recognized according to heat distribution of a human body, and a source of heat present in a deep part of the human body may be analogized. As another example, a mechanism of heat generation and its influence onto the surroundings may be found during a machine stress diagnosis.

Those skilled in the art will appreciate that the conceptions and specific embodiments disclosed in the foregoing description may be readily utilized as a basis for modifying or designing other embodiments for carrying out the same purposes of the present disclosure. Those skilled in the art will also appreciate that such equivalent embodiments do not depart from the spirit and scope of the disclosure as set forth in the appended claims.

The invention claimed is:

1. A 3-dimensional (3D) stereo image camera system for generating a 3D stereo image, the system comprising:
    first and second thermal imaging cameras horizontally spaced apart by a predetermined distance to photograph a subject; and
    a stereo & disparity engine for providing a control signal and a clock signal to the first and second thermal imaging cameras, receiving thermal imaging data from each of said thermal imaging cameras, and calculating disparity data, distance/depth data, and temperature data of the subject from the thermal imaging data,
    wherein the stereo & disparity engine includes a function of matching and synchronizing lens focuses of the first and second thermal imaging cameras according to the control signal, a function of synchronizing shutter motions of the first and second thermal imaging cameras, and a function of providing a reference value relating to the performance of at least one property of a dynamic range, histogram, brightness and contrast of the thermal imaging cameras to the first and second thermal imaging cameras, respectively, and setting the first and second thermal imaging cameras to be identical in terms of the performance of at least one property.

2. The 3D stereo image camera system according to claim 1,
    wherein the first thermal imaging camera is a master camera, the second thermal imaging camera is a slave camera, and the reference value relating to the performance of at least one property is a reference value relating to the master camera.

3. The 3D stereo image camera system according to claim 2,
    wherein the reference value relating to the performance of at least one property of histogram, brightness, and contrast is a value of histogram, brightness, and/or contrast in a thermal image of the master camera, which is obtained by photographing a single reference black body by the master camera and the slave camera.

4. The 3D stereo image camera system according to claim 2,
    wherein the stereo & disparity engine includes a disparity/isothermal processing unit for generating disparity data and temperature-related data from a thermal image of the master camera and the slave camera,
    wherein the disparity/isothermal processing unit includes:
    an edge detector for detecting an edge (contour) of the subject from thermal images of the master camera and the slave camera respectively;
    a disparity calculator for calculating disparity data from output data of the edge detector;
    a distance/depth calculator for calculating distance/depth data of each subject from the output data of the disparity calculator;
    a temperature information extractor for extracting temperature-related data of the subject from the thermal image of the master camera; and
    an overlay processor for overlaying the temperature-related data and at least one of the disparity data and the distance/depth data on an image.

5. The 3D stereo image camera system according to claim 4, wherein the overlay processor overlays black-and-white disparity data representing distance/depth from the thermal imaging camera to the subject and temperature-related data including at least one of color temperature distribution data and a temperature value of a predetermined pixel on a 2D or 3D image.

6. The 3D stereo image camera system according to claim 4, wherein the overlay processor overlays color disparity data representing distance/depth from the thermal imaging camera to the subject and temperature-related data including at least one of black-and-white temperature distribution data and a temperature value of a predetermined pixel on a 2D or 3D image.

7. A 3D thermal imaging microscope, which includes the 3D stereo image camera system defined in claim 1.

8. A 3D body heat diagnosing device, which includes the 3D stereo image camera system defined in claim 1.

9. A measuring and metering device, which includes the 3D stereo image camera system defined in claim 1.

10. A method for generating a thermal image by using a 3D stereo image camera system which generates a 3D stereo image,
    wherein the 3D stereo image camera system includes; first and second thermal imaging cameras horizontally spaced apart by a predetermined distance; and a stereo & disparity engine for providing a control signal and a clock signal to the first and second thermal imaging cameras, receiving thermal imaging data from each thermal imaging camera, and calculating disparity data, distance/depth data, and temperature data of the subject from the thermal imaging data, wherein the method comprising:
    synchronizing clocks of the first and second thermal imaging camera according to a master clock;
    synchronizing lens focuses and shutter motions of the first and second thermal imaging cameras; and
    providing a reference value relating to the performance of at least one property of a dynamic range, histogram, brightness and contrast of the thermal imaging cameras to the first and second thermal imaging cameras, respectively, and setting the first and second thermal imaging cameras to be identical in terms of the performance of at least one property.

11. The method according to claim 10, further comprising:
    detecting an edge (contour) of the subject in thermal images respectively received from the first and second thermal imaging cameras;
    calculating disparity data from the detected edge data; and
    calculating distance/depth data from the disparity data.

12. The method according to claim 11, further comprising:
    extracting temperature data of the subject from the thermal image of the first thermal imaging camera; and
    overlaying the temperature data and at least one of the disparity data and the distance/depth data on a 2D or 3D image.

13. The method according to claim 12, wherein said overlaying includes:
    displaying the disparity data or the distance/depth data in black and white and the temperature data in color, or displaying the disparity data or the distance/depth data in color and the temperature data in black and white.

14. The method according to claim 11, before said detecting of an edge (contour) of the subject in thermal images respectively received from the first and second thermal imaging cameras, further comprising:
   selecting predetermined thermal image areas in the thermal images of the first and second thermal imaging cameras, respectively; and
   setting each selected thermal image area as a thermal image for image processing at a following stage and transferring the selected thermal image to the following stage, for the purpose of high-speed frame processing.

* * * * *